United States Patent
Govindan et al.

(10) Patent No.: US 9,904,623 B2
(45) Date of Patent: Feb. 27, 2018

(54) EARLY CACHE PREFETCHING IN PREPARATION FOR EXIT FROM IDLE MODE

(71) Applicant: Advanced Micro Devices, Inc., Sunnyvale, CA (US)

(72) Inventors: Madhu Saravana Sibi Govindan, Austin, TX (US); William Lloyd Bircher, Austin, TX (US); Aniruddha Dasgupta, Austin, TX (US); Dongyuan Zhan, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 27 days.

(21) Appl. No.: 14/701,778

(22) Filed: May 1, 2015

(65) Prior Publication Data

US 2016/0321183 A1    Nov. 3, 2016

(51) Int. Cl.
*G06F 12/00* (2006.01)
*G06F 12/0862* (2016.01)
*G06F 12/0875* (2016.01)
*G06F 1/32* (2006.01)

(52) U.S. Cl.
CPC ........ *G06F 12/0862* (2013.01); *G06F 1/3296* (2013.01); *G06F 12/0875* (2013.01); *G06F 2212/1024* (2013.01); *G06F 2212/1028* (2013.01); *G06F 2212/6024* (2013.01); *Y02B 60/1225* (2013.01)

(58) Field of Classification Search
None
See application file for complete search history.

(56) References Cited

U.S. PATENT DOCUMENTS

| 7,647,452 | B1* | 1/2010 | Moll | G06F 12/0802 |
| | | | | 711/118 |
| 2014/0181556 | A1* | 6/2014 | Eckert | G06F 1/324 |
| | | | | 713/323 |
| 2015/0081980 | A1* | 3/2015 | Walker | G06F 12/0802 |
| | | | | 711/135 |

OTHER PUBLICATIONS

"BIOS and Kernel Developers Guide (BKDG) for AMD Family 15h Models 00h-0Fh Processors", 42301 Rev. 3.14 Advanced Micro Devices, Jan. 23, 2013, pp. 61-90.

* cited by examiner

Primary Examiner — Baboucarr Faal

(57) ABSTRACT

A system includes a functional unit, at least one cache coupled to the functional unit, and a power management unit coupled to the functional unit and the at least one cache, the power management unit configured to trigger the functional unit to initiate prefetching of data to repopulate the at least one cache prior to a predicted exit of the functional unit from an idle mode to an active mode. The system further may include a prediction unit to predict the exit from the idle mode for the functional unit as occurring a predetermined duration from an entry into the idle mode. The prediction unit may determine the predetermined duration based on a history of idle mode durations indicative of durations of previous instances in which the functional unit was in the idle mode.

20 Claims, 8 Drawing Sheets

EARLY CACHE PREFETCHING IN PREPARATION FOR EXIT FROM IDLE MODE

BACKGROUND

Field of the Disclosure

The present disclosure relates generally to computing systems and, more particularly, to power management in computing systems.

Description of the Related Art

Computing systems often utilize power-saving techniques in which the state of a processing component is temporarily saved to memory and the processing component is then placed in a low power state while in an idle mode. When the processing component exits the idle mode to return to an active mode, the saved state is accessed from the memory and used to restore the processing component to its previous state before entering the idle mode. However, when the processing component enters the idle mode, one or more caches associated with the processing component typically are flushed to a cache level or memory outside of the power domain of the processing component, and the flushed cache is then placed in a low power state in which the cache cannot reliably retain data. As such, when the processing component exits the idle mode, the cache is empty of valid data and the processing component suffers a "cold start" penalty because the initial memory accesses performed after the exit from the idle mode result in cache misses and thus must be serviced by memory or a higher level of cache. As memory accesses to memory or higher level caches exhibit higher latency than accesses to lower levels of cache, this cold start penalty can introduce significant performance losses.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION OF EMBODIMENT(S)

As the one or more caches associated with a processor core or other functional unit of a computing system are flushed when the functional unit is prepared for entry into a low power state, the reentry of the functional unit to an active mode can result in a significant cold start penalty due to the one or more empty caches. To reduce or eliminate this cold start penalty, FIGS. 1-9 describe example techniques for reinitializing the functional unit prior to a predicted exit from an idle mode and using the reinitialized functional unit to at least partially repopulate the one or more caches so that the functional unit is ready to resume instruction execution using the repopulated cache data, rather than having to rely on higher-latency memory accesses for the needed data. In at least one embodiment, when the functional unit transitions from an active mode to an idle mode, the contents of the one or more caches in the same power domain as the functional unit are flushed. Further, a prediction unit predicts the duration that functional unit will be in the idle mode based on one or more factors, such as a history of idle durations under similar circumstances. At a specified time prior to the lapse of this predicted duration, a power management unit triggers the functional unit to transition back to the active mode. As part of this transition, a cache repopulation unit operates to repopulate the one or more flushed caches with at least a portion of the data they stored prior to the idle mode transition (hereinafter, "the previously cached data"). As such, when the actual idle mode exit trigger occurs (e.g., the receipt of an interrupt), the functional unit may begin processing of the interrupt or other trigger using the repopulated data in the one or more caches, thus avoiding the cache misses and resulting high-latency memory accesses that plague conventional idle-to-active transition techniques.

Figure 1:
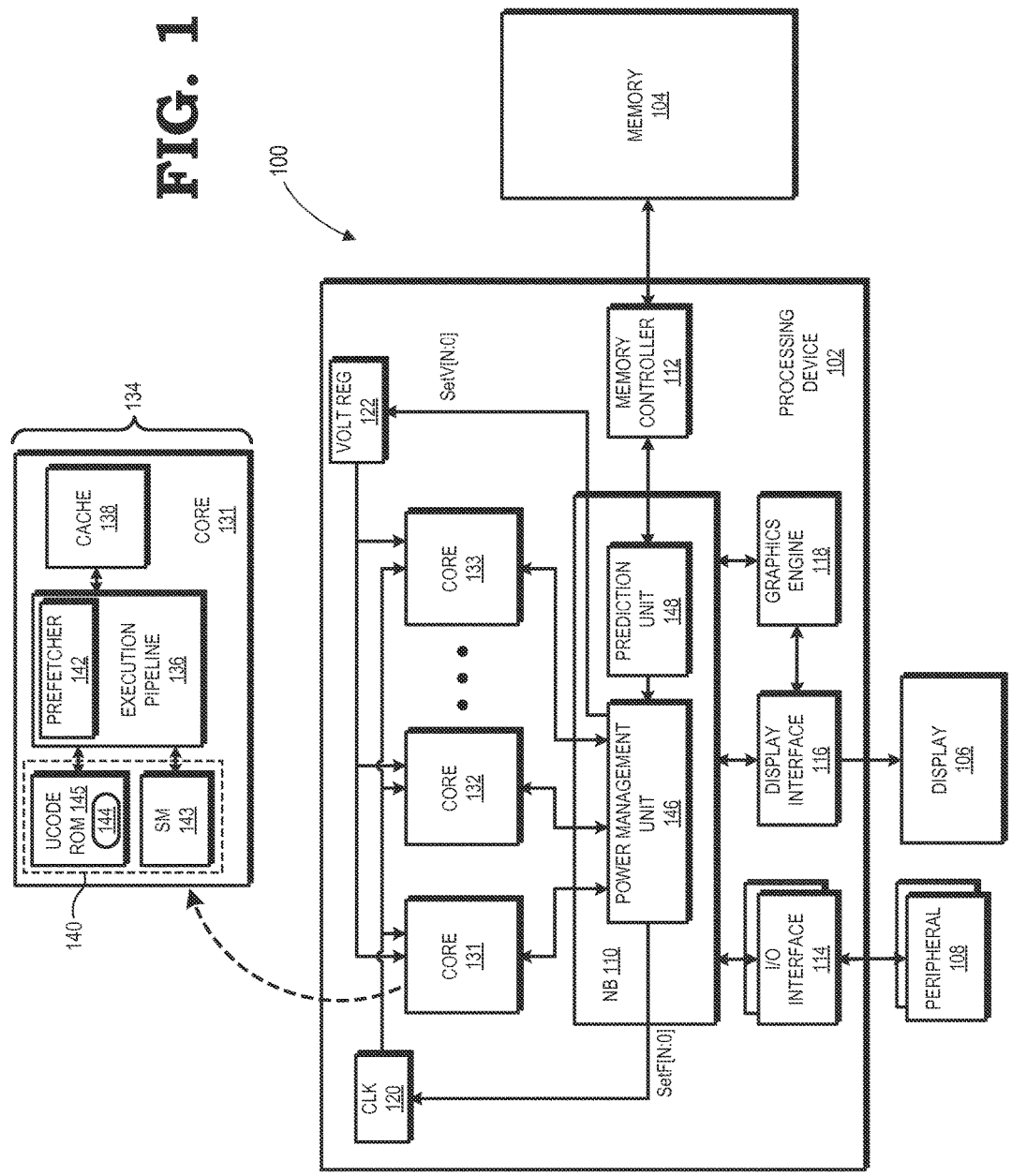
FIG. 1 is a block diagram of a computing system employing early cache prefetching in accordance with some embodiments.

FIG. 1 illustrates a computing system 100 utilizing early cache prefetching in anticipation of exit from an idle mode in accordance with some embodiments. The computing system 100 may include, for example, a desktop computer, laptop computer, a tablet computer, a computing-enabled cellular phone, a gaming console, a personal digital assistant, a computing-enabled watch or other computing enabled wearable device, and the like. In the depicted example, the computing system 100 includes a processing device 102 coupled to a memory 104 (e.g., system memory), a display 106, and one or more peripherals 108 (e.g., keyboard, mouse, printer, and the like). The processing device 102 may be implemented as a single integrated circuit, or as a combination of multiple integrated circuits, such as a system-on-a-chip (SoC). To illustrate, the processing device 102 (and the functional units formed thereon) may forming part of one semiconductor die, while the memory 106 forms part of a different semiconductor die.

The processing device 102 includes one or more functional units coupled to a northbridge 110, which in turn is coupled to a memory controller 112, one or more input/output (I/O) interfaces 114, a display interface 116, a graphics engine 118 (also referred to as a graphics processing unit or GPU), a clock source 120, and a voltage regulator 122. The functional units can comprise any of a variety of processing components configured to execute software or firmware instructions. Examples of such functional units include central processing unit (CPU) cores, GPU cores, digital signal processors (DSPs), and the like. For ease of reference, the techniques of the present disclosure are described in the example context of processor cores as functional components, such as the plurality of processor cores 131, 132, and 133 illustrated in FIG. 1. However, the described techniques may be employed for any of a variety of functional units, such as for the graphics engine 118, a DSP, and the like, using the guidelines provided herein.

As illustrated by an expanded view 134 of processor core 131, each of the processor cores 131-133 includes an execution pipeline 136, at least one cache 138, and a cache population unit 140. The execution pipeline 136 includes various stages or components used in executing instructions from an operating system or application being executed by the processing device 102, such as a prefetcher 142, a dispatch unit (not shown), an integer execution unit or arithmetic logic unit (ALU) (not shown), a floating point unit (FPU) (not shown), a retirement unit (not shown), and the like. The one or more caches 138 of the processor core form a cache hierarchy for temporarily storing data (including instructions) that may be accessed by the execution pipeline 136 with less latency than a memory access to the memory 104. For ease of illustration, the processor core is described as having a single cache; however, in other embodiments, the processor core may have multiple levels of caches within its power domain, or one or more caches may be shared by multiple processor cores. As described in greater detail herein, the cache population unit 140 operates to facilitate the repopulation of the one or more caches 138 with data in anticipation of a transition of the processor core from an idle mode to an active mode. The cache population unit 140 may be implemented as a hardware state machine 143, a dedicated set 144 of microcode instructions stored in a microcode read only memory (ROM) 145 (also referred to as a "control store") of the processor core, or a combination thereof.

The northbridge 110 provides a variety of interface functions for each of the processor cores 131-133, including interfacing with the memory 104 and to the peripherals 108. In addition, in the depicted embodiment, the northbridge 110 provides power management functionality for the processor cores 131-133 and the other functional units of the processing device 102. To this end, the northbridge 110 includes a power management unit 146 coupled to a prediction unit 148. The power management unit 146 controls the power states of the processor cores 131-133 via control of one or both of the clock source 120 (which provides clock signals to the processor cores 131-133) and the voltage regulator 122 (which provides regulated supply voltages to the processor cores 131-133). The power management unit 146 independently controls the N clock signals provided by the clock source 120 to the N processor cores via signaling denoted as "SetF[N:0]" and controls the N supply voltages provided by the voltage regulator 122 to the N processor cores via signaling denoted as "SetV[N:0]".

In at least one embodiment, the processor cores 131-133 have at least two general modes: an active mode, in which the processor core is doing useful work; and an idle mode, in which the CPU is idle (that is, not doing useful work). While in the active mode, the processor core may employ any of a number of different performance states or operating points, with corresponding pairings of clock frequency and voltage, as controlled by the power management unit 146. When a processor core is in the idle mode, the power management unit 146 may elect to place the processor core in a low power state (or an operating system (OS) may elect to do so via signaling provided to the functional unit).

However, there is overhead in entering a low power state in terms of energy costs and performance costs. Accordingly, in deciding whether to transition an idle processor core to a low power state, the power management unit 146 may determine whether entry into a low power state may provide power savings at or beyond a break-even point. For example, entry into the low power state may require flushing of one or more caches, saving architectural state, powering down phase locked loops (PLLs), and so on. Upon exit from the low power state, the PLLs may require a warm-up period before becoming fully operational, and restoration of a previous state may also be required upon exit from the low power state. As such, a relatively short idle mode duration may cause the cost/benefits evaluation to fall short of the break-even point, whereas a relatively long idle mode duration may provide power savings in excess of the power/performance costs of the low power state entry and exit transitions.

Accordingly, to facilitate this cost/benefit evaluation, the prediction unit 148 operates to predict the duration of the current idle mode (that is the, iteration of the idle mode which the processor core has entered, or is about to enter), and thus predict when the exit from the idle mode is to occur. The prediction unit 148 can utilize any of a variety of prediction methodologies in estimating or otherwise predicting the duration of the current idle mode. For example, the prediction unit 148 may implement the idle phase exit prediction process outlined in U.S. Patent Application Publication No. 2014/0181,556, entitled "Idle Phase Exit Prediction" and filed on Jun. 26, 2014, the entirety of which is incorporated by reference herein. As disclosed by this reference, the prediction unit 148 may store and analyze information regarding respective durations of a number of previously occurring idle modes for each processor core and respective durations of a number of previously occurring active modes for each processor core. The duration information for each processor core may be arranged in bins and the prediction unit 148 may then predict the duration of the current idle mode for each processor core based on this binned information. In other embodiments, the prediction unit 148 may use a different prediction process, such as assuming a predefined average duration for all idle modes, employing a lookup table or other data structure that is pre-populated with defined average idle mode durations based on the various criteria, such as the workload performed by the processor core prior to entry into the idle mode, and the like.

Using the predicted idle mode duration provided by the prediction unit 148, the power management unit 146 determines whether to place an idle processor core into a low power state. Thus, if the prediction unit 148 predicts that the current idle mode may be of a relatively short duration, the power management unit 146 may forgo entry into a low power state, as the costs incurred in doing so may outweigh the benefit of the power savings that may be obtained. Conversely, if the prediction unit 148 predicts that the current idle mode may be of a relatively long duration, the power savings obtained by entry into a low power state may outweigh costs of entry into that state. Thus, in the latter case, the power management unit 146 may place an idle processor core into a low power state responsive to determining that the predicted idle duration is sufficiently long to justify the costs of powering down and then subsequently powering up the idle processor core.

Typically, the power management unit 146 places an idle processor core into a low power state by one or both of power gating or clock gating the power domain of the processor core. The power management unit 146 may clock gate a processor core by controlling the clock source 120 via the corresponding bit of the SetF signal to inhibit the clock signal supplied to the processor core or to reduce the frequency of the clock signal to below a minimum operational frequency. The power management unit 146 may power gate a processor core by controlling the voltage regulator 122 via the corresponding bit of the SetV signal to drop the supply voltage provided to the processor core to a level below a minimum retention threshold of the circuitry of the processor core or to inhibit the supply of the supply voltage completely.

The power gating of a processor core typically causes the processor core to lose its architectural state at the time of entry into the low power state. Accordingly, in anticipation of a transition to a low power state, the processor core stores a copy of the pertinent architectural state to the memory 104, and when the processor core transitions out of the low power state, the saved architectural state is restored to the processor core, thereby allowing the processor core to effectively resume where it left off. The cache 138 is in the same power domain as the rest of the processor core, and thus when the processor core is power gated, the data stored in the cache 138 is lost. Accordingly, in at least one embodiment, in anticipation of the transition to a low power state, the cache population unit 140 operates to store cache restoration information in the memory 104, or to a cache outside of the power domain of the processor core, whereby the cache restoration information is representative of the data stored in the cache at the time of transition to the low power state (that is, the "previously-cached data"). Then, when the processor core is to transition back to an active mode, the cache population unit 140 operates to coordinate with the prefetcher 142 and other components of the execution pipeline 136 to perform a set of load operations that prefetch at least some of the data previously stored in the cache 138 so as to at least partially repopulate the cache 138 with the previously cached data.

In at least one embodiment, the power management unit 146 triggers the cache prefetching process prior to the predicted exit from the low power state so that the cache 138 is, at the time of the predicted exit, at least partially repopulated with previously cached data. In some embodiments, this early cache prefetching process is triggered a specified time prior to predicted exit. To illustrate, analysis or modeling of the performance of an implementation of the processing device 102 may reveal that X microseconds are needed, on average, to sufficiently repopulate the cache 138 using the techniques described herein, and thus the power management unit 146 may trigger the prefetching process at X seconds before the predicted exit. In other embodiments, the specified time before the predicted exit may be proportional to the number of valid cache lines in the cache 138 before it is flushed. For example, if modeling or analysis reveals it takes X microseconds to repopulate a completely full cache 138, then the specified time before the predicted exit may be set to $Y=f(X*F)$, where F represents the ratio of valid lines to total cache lines of the cache 138, or "fullness" of the cache 138, at the time of flushing. Other techniques for determining this predetermined duration before the predicted exit time may be utilized in accordance with the guidelines provided herein.

As described above, the conventional approach to low power state exit transitions results in the cache being empty when a processor core exits the low power state to process an incoming interrupt or other idle mode exit trigger. This results in a significant cold start penalty whereby the initial data requests by the processor core result in cache misses due to the empty cache, and thus must instead be serviced by accesses to memory. This reliance on memory accesses to access data after resuming execution incurs a significant time penalty due to the relatively high latency of memory accesses compared to cache accesses. In contrast, the early triggering of cache prefetching (that is, initiating cache prefetching before the predicted exit of the low power state) at least partially repopulates the cache 138 with its previously cached data, and thus when an interrupt arrives to trigger the processor core to exit the low power state, the processor core will experience fewer, if any, cache misses, and thus will incur a much smaller cold start penalty, if any at all.

Figure 2:
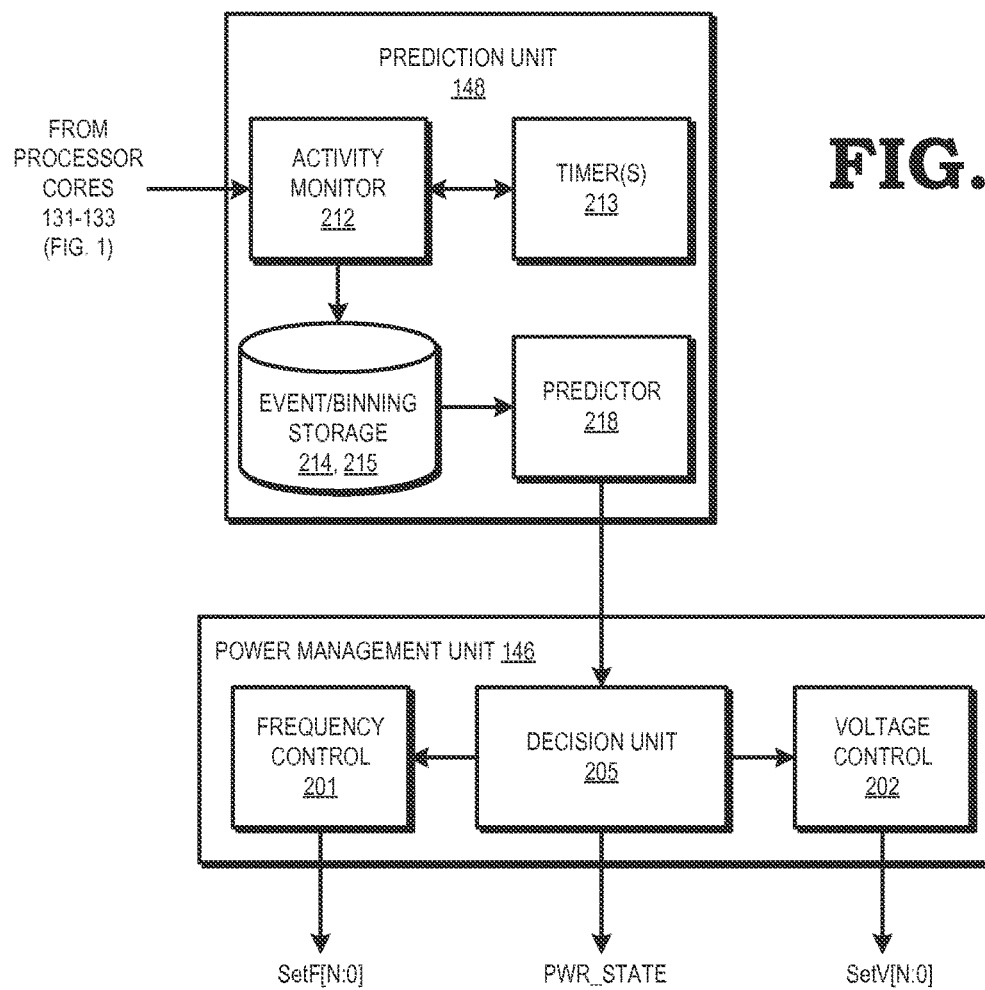
FIG. 2 is a block diagram illustrating a power management unit and prediction unit of the computing system of FIG. 1 in accordance with some embodiments.

FIG. 2 illustrates the power management unit 146 and the prediction unit 148 in greater detail in accordance with some embodiments. In the depicted example, the prediction unit 148 includes an activity monitor 212 coupled to receive indications of activity from the various processor cores 131-133. The types of activity monitored by the activity monitor 212 may include (but are not limited to) instructions executed, instructions retired, memory requests, and so forth. The prediction unit 148 further includes a plurality of timers 213. One timer 213 may be included for each of the functional blocks for which activity is to be monitored. Each of the timers 213 may be reset when activity is detected from its corresponding processor core by the activity monitor 212. After being reset, a given timer 213 may begin tracking the time since the most recent activity. Each timer 213 may report the time since activity was most recently detected in its corresponding processor core. After the time since the most recent activity has reached a certain threshold for a given processor core, activity monitor 212 may indicate that the given core is idle. The activity monitor 212 further may continue to record the time that the processor core is idle, based on the time value received from the corresponding timer 213, until the core resumes activity. As an alternative to implementing the activity monitor 212, entry into an idle mode may be determined responsive to a halt instruction from the operating system executed by the processing device 102. In general, any suitable mechanism can be used to determine if a processor core is idle, and such mechanisms may be implemented using hardware, software, or any combination thereof.

When a processor core has resumed activity after having been in the idle mode, the activity monitor 212 may record the duration of the idle mode in that core in event storage 214. In the embodiment shown, the event storage 214 may store the duration for each of the most recent N instances of the idle mode, as idle mode times are being monitored for each of the processor cores. In one embodiment, the event storage 214 may include a plurality of first-in, first-out (FIFO) memories, one for each processor core. Each FIFO in the event storage 214 may store the duration of the most recent N instances of the idle mode for its corresponding processor core. As the durations of new instances of idle modes are recorded in a FIFO corresponding to a given core, the durations for the oldest idle mode instances may be overwritten.

Binning storage 215 (illustrated as a single joint storage with event storage 214) stores, for each processor core, counts of idle mode durations in corresponding bins in order to generate a distribution of idle mode durations. The binning storage 215 may include logic to read the recorded durations from the event storage 214 and may generate the count values for each bin. As old duration data is overwritten by new duration with the occurrence of additional instances of the idle mode, the logic in the binning storage 215 may update the count values in the bins. Prediction logic 218 is coupled to the binning storage 215. Based on the distribution of idle mode durations for a given processor core, predictor logic 218 generates a prediction as to the duration of the current idle mode. An example binning methodology and various example prediction methodologies used to generate the prediction based on the binning results are described in greater detail in reference to the aforementioned U.S. Patent App. Publication No. 2014/0181556.

In addition to predictions for the duration of the idle mode, predictor logic 218 may also generate indications for specified times at which low power states may be exited based on the idle mode duration predictions. For example, in one embodiment, if a processor core is placed in a sleep state (i.e. power and clock are both removed therefrom) during an instance of the idle mode, the power management unit 146 may cause that core to exit the sleep state at a specified time based on the predicted idle mode duration. This exit from the sleep state may be invoked without any other external event (e.g., an interrupt from a peripheral device) that would otherwise cause an exit from the sleep state. Moreover, the exit from the sleep state may be invoked before the predicted duration of the idle mode has fully elapsed. If the prediction of idle mode duration is reasonably accurate, the preemptive exit from the sleep state may provide various performance advantages. For example, the restoring of a previously stored state may be performed between the time of the exit from the sleep state and the resumption of the active mode, thus enabling the processor core to begin executing instructions faster than it might otherwise be able to do so in the case of a reactive exit from the sleep state. Further, the restoring of at least a portion of the data stored in the cache 138 likewise may be performed between the time of the exit from the sleep state and the resumption of the active mode, and thus enabling the processor core to rapidly access data from the cache 138. Additional details regarding the preemptive exit from a low power state are provided below.

Predictions made by the predictor logic 218 may be forwarded to a decision unit 205 of the power management unit 146. In the depicted embodiment, the decision unit 205 may use the prediction of idle mode time, along with other information, to determine whether to place an idle processor core in a low power state. Additionally, the decision unit 205 may determine what type of low power state the idle processor core is to be placed. For example, if the predicted idle duration is relatively short, the decision unit 205 may reduce power consumption by reducing the frequency of a clock signal provided to the processor core, reducing the voltage supplied to the processor core, or both. In another example, if the predicted idle duration is long enough such that it exceeds a break-even point, decision unit 205 may cause the idle processor core to be placed in a sleep state (one particular example of a low power state) in which neither power nor an active clock signal is provided to the core. Responsive to determining into which power state a processor core is to be placed, the decision unit 205 may provide power state information ("PWR_STATE") to that core. A processor core receiving updated power state information from the decision unit 205 may perform various actions associated with entering the updated power state (e.g., a state save in the event that the updated power state information indicates that the processor core will be entering the low power state).

The power management unit 146 further includes a frequency control unit 201 and a voltage control unit 202. The frequency control unit 201 operates to generate control the signals SetF[N:0] provided to the clock source 120 for adjusting the frequency of the clock signals provided to each of the processor cores. The frequency of a clock signal provided to a given one of processor cores may be adjusted independently of the clock signals provided to the other cores. The voltage control unit 202 operates to generate the control signal SetV[N:0] provided to the voltage regulator 122 for independently adjusting the respective supply voltages received by each of the processor core. Voltage control signals may be used to reduce a supply voltage provided to a given processor core, increase a supply voltage provided to that core, or to turn off that core by inhibiting it from receiving any supply voltage. Both the frequency control unit 201 and the voltage control unit 202 may generate their respective control signals based on information provided to them by the decision unit 205.

Figure 3:
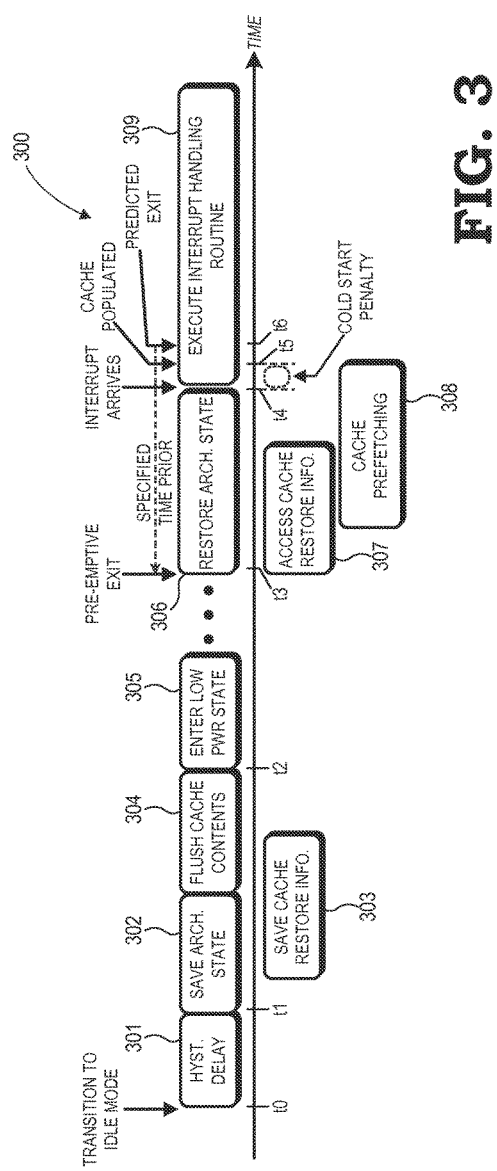
FIG. 3 is a diagram illustrating an idle mode/active mode transition with early cache prefetching in accordance with some embodiments.
Figure 5:
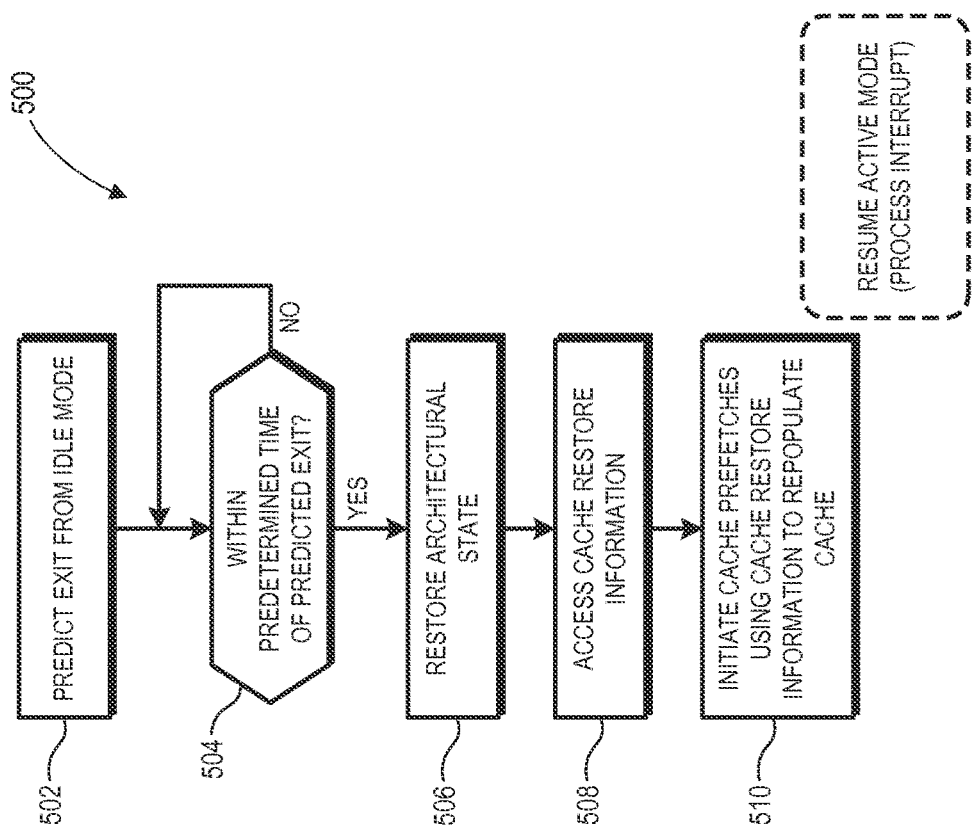
FIG. 5 is a flow diagram illustrating a low power state exit transition process in accordance with some embodiments.
Figure 4:
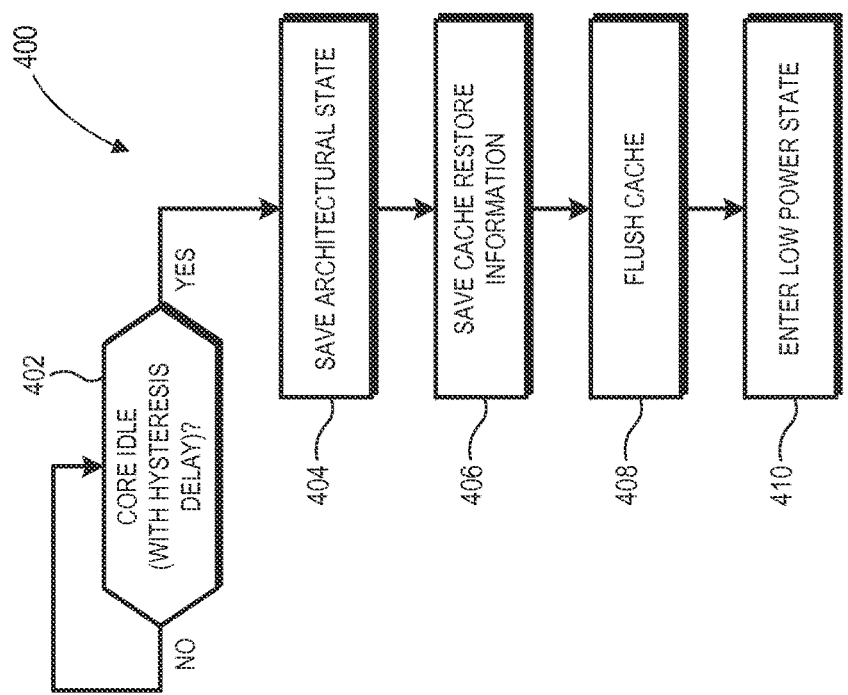
FIG. 4 is a flow diagram illustrating a low power state entry transition process in accordance with some embodiments.

FIGS. 3-5 illustrate a low power state entry transition process (FIG. 4) and a low power state exit transition process (FIG. 5) with reference to an example entry/exit transition depicted by FIG. 3 in accordance with some embodiments. In particular, the timeline 300 depicted in FIG. 3 represents a sequence of events, or stages, occurring in the transition of a processor core into a low power state in response to the processor core entering an idle mode (entry transition process 400 of FIG. 4), and then a transition of the processor core from the low power state to an active mode so as to process an incoming interrupt (exit transition process of FIG. 5).

In response to detecting that a processor core has become idle at time t0, at block 402 the power management unit 146 employs a hysteresis countdown timer (not shown) to prevent premature entry into a low power state when there is a high frequency of interrupts, as depicted by stage 301 of timeline 300. When the timer expires at time t1, the decision unit 205 of the power management unit 146 initiates the transition of the idle processor core to a low power state through configuration of a signal denoted PWR_STATE (FIG. 3). In response to this signaling, at block 404 the idle processor core prepares for the low power state by saving a copy of its architectural state to the memory 104 or to a cache level outside of the core's power domain, as illustrated by stage 302 of timeline 300.

At block 406, the cache population unit 140 prepares and stores cache restoration information to the memory 104 or to a cache level outside of the core's power domain, as illustrated by stage 303 of timeline 300. The cache restoration information includes data or other information that is used by the cache population unit 140 to manage a cache prefetching process in order to repopulate the cache 138 in anticipation of the predicted exit from the low power state. As described in detail below with reference to FIGS. 6-8, this cache restoration information can include, for example, state information from the prefetcher 142, tag array information from the cache 138, history information representing a sequence of instruction pointers (IP) of instructions executed by the execution pipeline 136 leading up to the processor core's entry into the idle mode, and the like.

At block 408, the processor core flushes the contents of its cache hierarchy sharing the same power domain as the idle processor core (e.g., cache 138), as represented by stage 304 of timeline 300. At this point, it should be noted that while FIGS. 3 and 4 illustrate an example sequence of the processes for saving the architectural state, saving the cache restoration information, and flushing the cache, these processes may be performed in an order that differs from that shown. With these preparations complete, at block 410 the power management unit 146 places the processor core into the low power state by one or both of power gating or clock gating the processor core, as illustrated by stage 305 beginning at time t2 of timeline 300.

Referring now to the exit transition process 500 of FIG. 5, at block 502 the prediction unit 148 predicts the duration that the processor core will be in the idle mode before being transitioned back to an active mode by an interrupt or other waking triggers. As noted, the prediction unit 148 can use any of a variety of predictive exit techniques to predict this duration, such as the one described by the aforementioned U.S. Patent Application Publication No. 2014/0181556. In the illustrated example of timeline 300, the duration is predicted to extend to time t6; that is, the predicted exit from the idle mode is time t6.

With the predicted idle mode duration information from the prediction unit 148, at block 504 the power management unit 146 starts a countdown timer that is set to expire at a specified amount of time prior to the predicted exit from the low power state. As described above, this specified time prior to the predicted exit may be a fixed amount of time, an amount of time that is a function of a property of the valid data in the cache 138 at the time of entry into the low power mode, and the like. In the illustrated example, this specified time prior to the predicted exit is depicted as time t3. Thus, when the timer expires at time t3, the power management unit 146 ceases to power gate/clock gate the processor core and then signals the processor core to begin a restoration process to prepare for the anticipated transition to the active mode. Thus, in response to this signaling, at block 506 the processor core accesses the architectural state saved to the memory 104 and uses this information to restore the architectural state of the processor core, as illustrated by stage 306 of timeline 300. Likewise, at block 508 the cache population unit 140 access the copy of the cache restoration information stored at the memory 104, as illustrated by stage 307 of timeline 300. At block 510 the cache population unit 140 uses this cache restoration information to coordinate with the prefetcher 142 and other components of the processor core to begin prefetching data from the memory 104 so as to repopulate the cache 138 with at least a portion of the data that was in the cache 138 when the processor core entered the idle mode, as illustrated by stage 308 of timeline 300. Timeline 300 depicts stages 307 and 308 as overlapping to reflect that the early prefetching may start as each successive portion of the cache restoration information is accessed from the memory 104.

In the particular example of FIG. 3, an interrupt arrives at time t4, which is slightly prior to the predicted exit at time t6. Also in this example, the cache restoration process represented by stage 308 does not finish until time t5, which is slightly after the arrival of the interrupt at time t4. Thus, in this example, there is some possibility that an interrupt handling routine executed at stage 309 to handle the interrupt may request data yet to be restored to the cache 138, and thus incur a cache miss and corresponding need for a memory access to obtain this data. As such, in this particular example, the processor core may experience a slight cold start penalty represented by the time between when the interrupt is received at time t4 and the time that cache repopulation completes at time t5. However, this cold start penalty is significantly less than the cold start penalty that would be incurred in a conventional system, since the cache would be completely empty at the time of arrival of the interrupt at time t4, and thus a significant time would pass (well past time t5) before the cache would be repopulated with data following the interrupt arrival. Moreover, the example presented by FIG. 3 represents an extreme case for purposes of illustration. In many instances, the timing of the cache repopulation process represented by stages 307 and 308 could be configured to ensure that the cache repopulation process will complete before an interrupt is received in most cases, thereby eliminating any cold start penalty.

Figure 6:
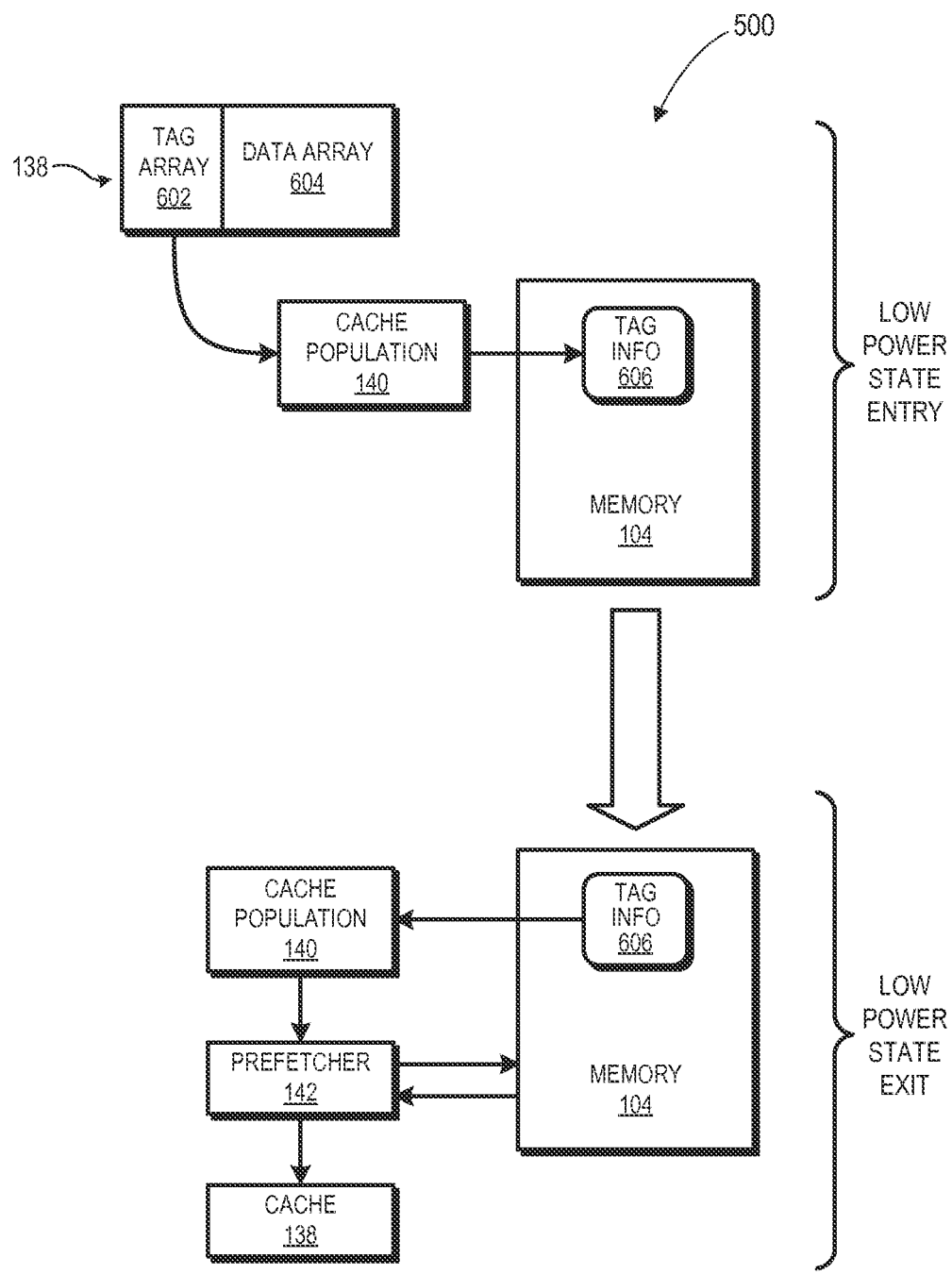
FIG. 6 is a diagram illustrating a cache repopulation process based on stored cache tag information in accordance with some embodiments.
Figure 7:
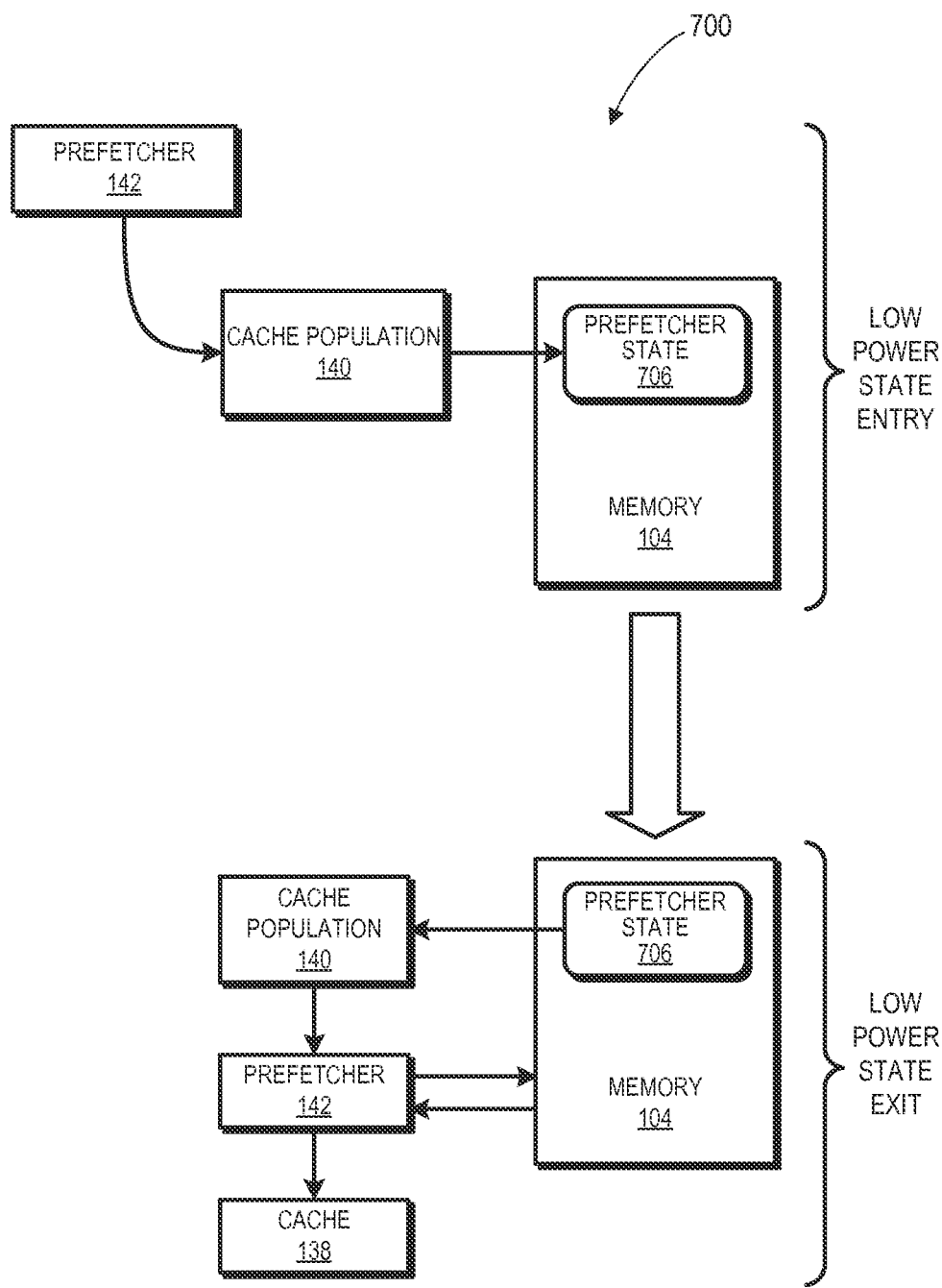
FIG. 7 is a diagram illustrating a cache repopulation process based on prefetcher state restoration in accordance with some embodiments.
Figure 8:
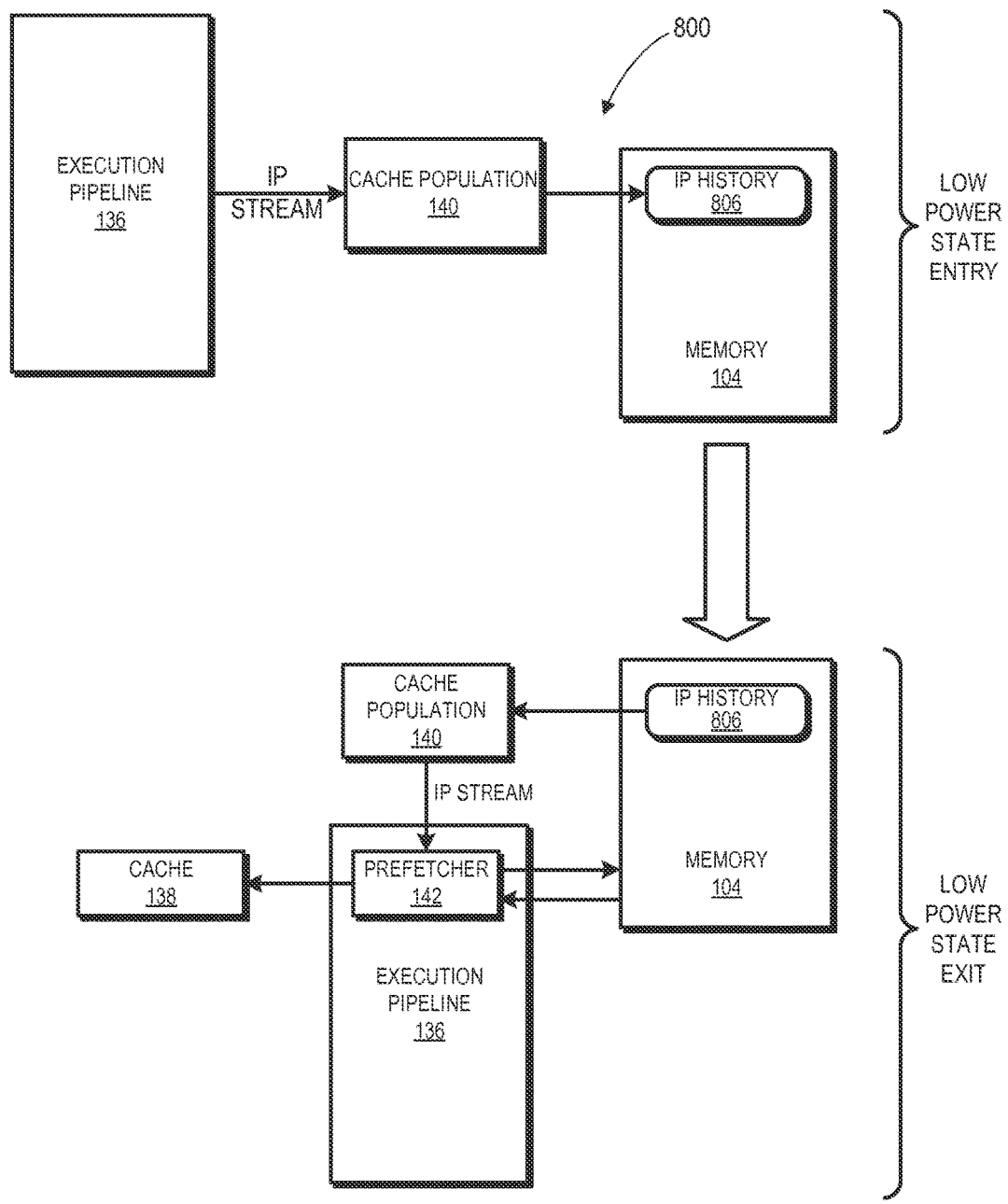
FIG. 8 is a diagram illustrating a cache repopulation process based on replay of a recent portion of an instruction stream in accordance with some embodiments.

FIGS. 6-8 illustrate various example implementations of the cache restoration information utilized by the cache population unit 140 for early prefetching to restore the cache 138 in anticipation of exit from a low power state. As described above, the cache population unit 140 stores the cache restoration information to the memory 104 or to a higher level cache unaffected by the processor core entering the low power state when the processor core transitions to a low power state, and the cache population unit 140 then accesses this cache restoration information from the memory 104 or higher-level cache prior to a predicted exit from the low power state in order to restore at least a portion of the previously cached data back into the cache 138. To restore the previously cached data, the memory addresses of the data are needed to perform a set of one or more load operations used to access this data from the memory 104 or a higher level cache for transfer to the cache 138. In some embodiments, the cache restoration information directly represents the memory addresses for the previously cached information in some manner. In other embodiments, the cache restoration information represents state or other information that permits some or all of the memory addresses of the previously cached data to be indirectly determined, such as through a replay of instructions executed by the processor core immediately prior to its entry into the idle mode.

FIG. 6 illustrates an example implementation of the cache restoration information as based on tag array information of the cache 138. As with a typical cache, the cache 138 is composed of a tag array 602 and a data array 604. The data array 604 has a plurality of cache lines, each cache line configured to store a corresponding segment of data from the memory 104, and the tag array 602 has a plurality of tag lines, each tag line associated with a corresponding cache line and configured to store at least a portion of the memory address of the data stored in the corresponding cache line. As such, the address portions in the tag array 602, in conjunction with the page tables stored and restored as part of the architectural state of the processor core, identify the memory addresses of the previously cached data. Accordingly, in at least one embodiment, when preparing to enter a low power state, the cache population unit 140 operates to store the tag array information 606 of the tag array 602, or a representation thereof, as cache restoration information. As the data array 604 may have both valid data and invalid data, in some embodiments, the cache population unit 140 may filter the address data of the tag array 602 so as to store the address portions for only the valid lines of the cache 138. Subsequently, when activated at a specified time prior to the predicted exit from the idle mode, the cache population unit 140 accesses the tag array information 606 from the memory 104, and sequences through each address portion contained therein to determine a target memory address represented by the address portion, and controls the prefetcher 142 to initiate a load operation to prefetch the data stored at the target memory address (as translated in conjunction with the restored page tables) into the cache 138.

FIG. 7 illustrates an example implementation 700 of the cache restoration information as based on state information for the prefetcher 142 in accordance with some embodiments. In the course of operation, the state of the prefetcher 142 develops to reflect the data recently prefetched for an instruction stream and the data to soon be prefetched for this instruction stream. As such, the state of the prefetcher 142 at entry into an idle mode reflects at least a portion of the data cached in the cache 138, as well as a portion of the data about to be cached in the cache 138, at entry into the idle mode. Accordingly, in some embodiments, when preparing to enter a low power state, the cache population unit 140 operates to store some or all of prefetcher state information 706 as cache restoration information in memory 104 or in a higher level cache. To illustrate, the prefetcher 142 may track the addresses of frequently missed cache blocks that were accessed during a previous, but recent, low-power state exit. These blocks are highly likely to be used by the cores that transition from a low-power state (e.g., a C6 state) to the normal state (e.g., a C0 state). Thus, the data representing this tracking information (one example of the prefetcher state) may be used as the prefetcher state information 706. As another example, the prefetcher 142 may track a "base" memory address and a detected stride in the memory accesses for each of one or more memory access streams, which are used by the prefetcher 142 to predict the next prefetch target address for each monitored stream. Thus, the prefetcher state information 706 may comprise this base address and stride information for one or more of the memory access streams.

In some embodiments, the prefetcher state is stored in conjunction with the other saved architectural state of the processor core during the low power mode transition, while in other embodiments the prefetcher state is stored separately. Subsequently, when activated at a specified time prior to the predicted exit from the idle mode, the cache population unit 140 accesses the prefetcher state information 706 from the memory 104 and restores the prefetcher 142 to the state represented by this cache restoration information. So restored, the prefetcher 142 is configured to commence prefetching at the point it left off upon transition into the low power mode. Accordingly, the prefetcher 142 begins performing a set of load operations so as to begin populating the cache 138 with data anticipated to be accessed in the instruction stream resumed upon the processor core's reentry into the active mode.

FIG. 8 illustrates an example implementation 800 of the cache restoration information as configured to support a "dummy" replay of the instruction stream that led up to the entry into the low power state in accordance with some embodiments. As the cache 138 stores data that was accessed from the memory 104 (or higher level cache) through execution of load instructions in the instruction stream of the processor core, the load instructions executed by the execution pipeline 136 of the processor core leading up to the entry into the idle mode reflect at least a portion of the data cached in the cache 138 at the time of entry into the idle mode. Thus, the cache population unit 140 may operate to buffer instruction history information composed of a sliding window of a stream of instruction pointers (IPs) representing the instruction stream executed by the execution pipeline 136. In response to the power management unit 146 signaling an imminent transition to a low power state, the cache population unit 140 stores the buffered IP stream segment (which represents the stream of instructions leading up to the low power state transition) as cache restoration information 806 in memory 104 or in a higher level cache. In some embodiments, the cache population unit 140 may filter the IP stream segment before storage so as to remove IPs representing instructions that ultimately have no bearing on the load instructions represented in the IP stream segment. Subsequently, when activated at a specified time prior to the predicted exit from the idle mode, the cache population unit 140 accesses the cache restoration information 806 from the memory 104 and triggers the execution pipeline 136 to replay the instruction stream run by the processor core immediately before entering the low power state by sequentially feeding to the execution pipeline 136 each IP of the IP stream segment represented by the cache restoration information 806. Each load instruction represented in this IP stream segment triggers the prefetcher 142 to prefetch the corresponding data from the memory 104 and to store the resulting data in the cache 138, and thus the replay of the IP stream segment results in at least a portion of the previously cached data being restored to the cache 138 and thus available for access upon the processor core's reentry into the active mode.

In some embodiments, the apparatus and techniques described above are implemented in a system comprising one or more integrated circuit (IC) devices (also referred to as integrated circuit packages or microchips), such as the processing device 102 described above with reference to FIGS. 1-8. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory, tangible storage medium, or combination of non-transitory, tangible storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 9:
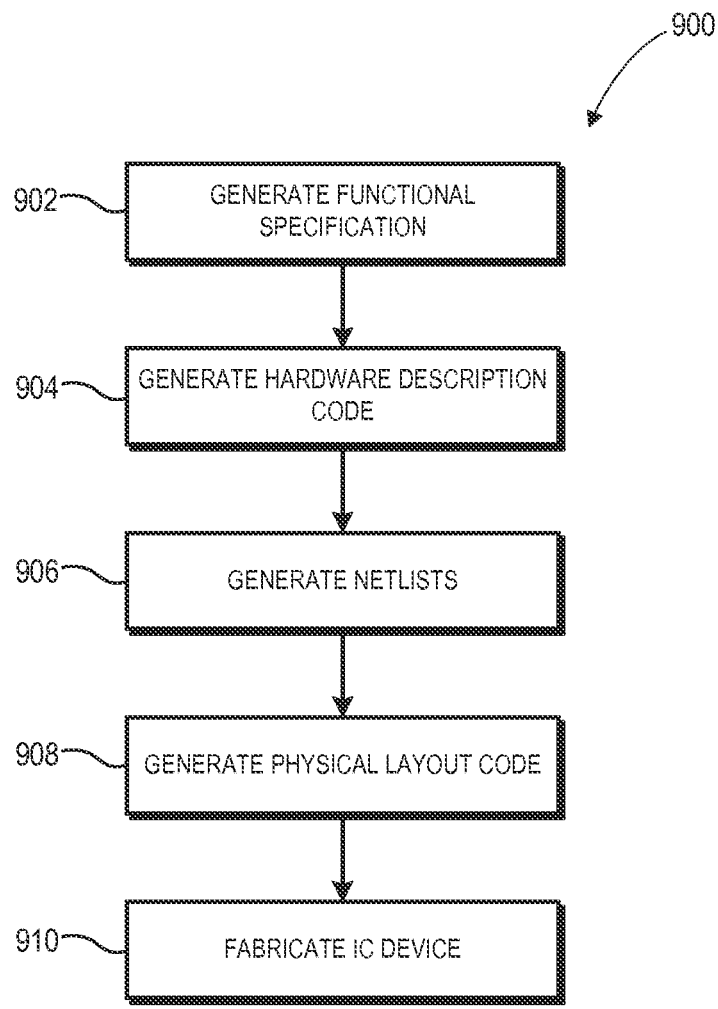
FIG. 9 is a flow diagram illustrating a method for designing and fabricating an integrated circuit device implementing at least a portion of a component of a computing system in accordance with some embodiments.

FIG. 9 is a flow diagram illustrating an example method 900 for the design and fabrication of an IC device implementing one or more aspects in accordance with some embodiments. As noted above, the code generated for each of the following processes is stored or otherwise embodied in non-transitory computer readable storage media for access and use by the corresponding design tool or fabrication tool.

At block 902 a functional specification for the IC device is generated. The functional specification (often referred to as a micro architecture specification (MAS)) may be represented by any of a variety of programming languages or modeling languages, including C, C++, SystemC, Simulink, or MATLAB.

At block 904, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 906 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 908, one or more EDA tools use the netlists produced at block 906 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 910, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

In some embodiments, certain aspects of the techniques described above may implemented by one or more processors of a computing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. In a processing device, a method comprising: predicting that an exit from an idle mode for a functional unit will occur a predetermined duration after an entry into the idle mode; starting a timer that is set to expire prior to the predicted exit; transitioning the functional unit to an active mode in response to the timer expiring and prior to a time corresponding to the predicted exit; and initiating prefetching of data in response to the predicted exit and prior to the time corresponding to the predicted exit to repopulate at least one cache coupled to the functional unit.

2. The method of claim 1, wherein initiating prefetching of data prior to the predicted exit comprises: performing a set of one or more load operations to load the data from a memory to the cache prior to the predicted exit.

3. The method of claim 2, further comprising: storing contents of a tag array of the cache to a memory prior to the functional unit entering a low power state while in the idle mode; accessing the contents of the tag array from the memory prior to the predicted exit; and determining target memory addresses for each load operation of the set of one or more load operations based on the contents of the tag array accessed from the memory.

4. The method of claim 2, further comprising: storing state information of a prefetcher of the processing device to a memory prior to the functional unit entering a low power state while in the idle mode; accessing the state information from the memory and restoring a state of the prefetcher based on the state information prior to the predicted exit; and wherein performing the set of one or more load operations comprises performing the set of one or more load operations using the prefetcher with the restored state.

5. The method of claim 1, further comprising: storing to a memory instruction history information representing a sequence of instruction pointers of an instruction stream executed by the functional unit prior to the functional unit entering a low power state while in the idle mode; and wherein initiating prefetching of data prior to the predicted exit comprises: accessing the instruction history information from the memory prior to the predicted exit; and executing a replay of a portion of the instruction stream using the sequence of instruction pointers represented in the accessed instruction history information.

6. The method of claim 1, wherein initiating prefetching of data prior to the predicted exit comprises prefetching the data based on execution, at the functional unit, of microcode dedicated to populating the at least one cache.

7. The method of claim 1, wherein initiating prefetching of data prior to the predicted exit comprises prefetching the data using a hardware state machine dedicated to populating the at least one cache.

8. The method of claim 1, further comprising: determining the predetermined duration based on a history of idle mode durations indicative of durations of previous instances in which the functional unit was in the idle mode.

9. A system comprising: a functional unit;
at least one cache coupled to the functional unit;
a timer;
a power management unit coupled to the functional unit and the at least one cache, the power management unit configured to trigger the functional unit to transition to an active mode in response to expiration of the timer and to initiate prefetching of data to repopulate the at least one cache in response to a predicted exit of the functional unit from an idle mode to an active mode and prior to a time corresponding to the predicted exit, wherein the timer is set to expire prior to the predicted exit;
and a prediction unit coupled to the functional unit and to the power management unit to predict that the exit from the idle mode for the functional unit will occur a predetermined duration after an entry into the idle mode.

10. The system of claim 9, further comprising: a cache population unit to store contents of a tag array of the cache to a memory prior to the functional unit entering a low power state while in the idle mode, to access the contents of the tag array from the memory prior to the predicted exit, and to determine target memory addresses for each load operation of a set of one or more load operations based on the contents of the tag array accessed from the memory, the set of load operations to load the data from the memory to the cache prior to the predicted exit.

11. The system of claim 9, further comprising: a cache population unit to store state information of a prefetcher of the functional unit to a memory prior to the functional unit entering a low power state while in the idle mode, to access the state information from the memory, and to restore a state of the prefetcher based on the state information prior to the predicted exit; and wherein the prefetcher is to perform a set of one or more load operations with the prefetcher having the restored state, the set of load operations to load the data from the memory to the cache prior to the predicted exit.

12. The system of claim 9, further comprising:
a cache population unit to store to a memory instruction history information representing a sequence of instruction pointers of an instruction stream executed by the functional unit prior to the functional unit entering a low power state while in the idle mode; and
wherein in response to the power management unit triggering the functional unit to initiate prefetching of data, the cache population unit is to access the instruction history information from the memory prior to the predicted exit, and control the functional unit to execute a replay of a portion of the instruction stream using the sequence of instruction pointers represented in the accessed instruction history information.

13. The system of claim 9, wherein the functional unit stores microcode that, when executed by the functional unit, manipulates the functional unit to initiate prefetching of data prior to the predicted exit so as to repopulate the at least one cache.

14. The system of claim 9, wherein the functional unit comprises a hardware state machine that manipulates the functional unit to initiate prefetching of data prior to the predicted exit so as to repopulate the at least one cache.

15. The system of claim 9, wherein the prediction unit is to determine the predetermined duration based on a history of idle mode durations indicative of durations of previous instances in which the functional unit was in the idle mode.

16. The system of claim 9, further comprising: a memory storing at least one of: instruction history information representing a sequence of instruction pointers of an instruction stream executed by the functional unit prior to the functional unit entering a low power state while in the idle mode; and contents of a tag array of the cache prior to the functional unit entering a low power state while in the idle mode.

17. The system of claim 16, wherein the functional unit is part of a processor forming part of a first semiconductor die and wherein said memory forms part of a second semiconductor die different from said first semiconductor die.

18. The system of claim 17, wherein the processor enters the low power state in response to receipt of an instruction from an operating system.

19. A non-transitory computer readable medium embodying a set of executable instructions, the set of executable instructions to manipulate a computer system to perform a portion of a process to fabricate at least part of a processing device, the processing device comprising:
a functional unit;
at least one cache coupled to the functional unit;
a timer
a power management unit coupled to the functional unit and the at least one cache, the power management unit configured to trigger the functional unit to transition to an active mode in response to the timer expiring and to initiate prefetching of data to repopulate the at least one cache in response to a predicted exit of the functional unit from an idle mode to an active mode and prior to a time corresponding to the predicted exit, wherein the timer is set to expire prior to the predicted exit; and a prediction unit coupled to the functional unit and to the power management unit to predict that the exit from the idle mode for the functional unit will occur a predetermined duration after an entry into the idle mode.

20. The non-transitory computer readable medium of claim 19, wherein the prediction unit is to determine the predetermined duration based on a history of idle mode durations indicative of durations of previous instances in which the functional unit was in the idle mode.

* * * * *